United States Patent [19]

Schmidt-Hellerau et al.

[11] Patent Number: 4,963,599
[45] Date of Patent: Oct. 16, 1990

[54] PREPARATION OF WOODWORKING MATERIALS

[75] Inventors: Christof Schmidt-Hellerau, Ludwigshafen; Johann Mayer, Freinsheim, both of Fed. Rep. of Germany

[73] Assignee: BASF Aktiengesellschaft, Ludwigshafen, Fed. Rep. of Germany

[21] Appl. No.: 251,390
[22] Filed: Sep. 30, 1988
[30] Foreign Application Priority Data Oct. 5, 1987 [DE] Fed. Rep. of Germany ....... 3733630

[51] Int. Cl.$^5$ .......................... C08K 9/04; C08K 9/12; C08J 3/18; C08J 5/06
[52] U.S. Cl. ..................................... 523/211; 524/14
[58] Field of Search ........................... 523/211; 524/14
[56] References Cited

U.S. PATENT DOCUMENTS 4,431,699 2/1984 Hunsucker ............................. 524/14

Primary Examiner—Merrell C. Cashion, Jr.
Assistant Examiner—Carlos Azpuru
Attorney, Agent, or Firm—Keil & Weinkauf

[57] ABSTRACT

Woodworking materials having a lower subsequent formaldehyde emission can be prepared in an advantageous manner and with good resin reactivity and good strengths and swelling properties by mixing lignocellulose-containing particles, for example wood particles, with a curable binder based on curable aminoplast condensates and then pressing the mixture under the action of heat, a mixture A containing a water-compatible agent for binding formaldehyde being applied to or mixed with the particles before the latter are mixed with the curable binder, if the mixture A is an aqueous solution which has a pH of from 3.0 to 6.5 and contains (a) organic acids which attack wood only insignificantly, if at all, in an amount of more than 15% by weight, based on the solids content of the solution, preferably a mixture of aliphatic carboxylic acids of 4 to 10 carbon atoms, and (b) a formaldehyde-binding, nitrogen-containing compound, in particular urea.

10 Claims, No Drawings

PREPARATION OF WOODWORKING MATERIALS

The present invention relates to a process for the preparation of woodworking materials which have a lower formaldehyde emission and in which a mixture of certain curing agents and a formaldehyde-binding, nitrogen-containing compound, in particular urea, is applied to the particles or mixed with them before the lignocellulose-containing particles are mixed with the aminoplast binder, i.e. before the gluing process.

The production of particle boards using particles and curable aminoplasts and/or phenoplasts has long been known. It is known that urea, melamine, benzoguanamine, dicyanodiamide, resorcinol, ammonia, etc., as well as starch, casein, blood albumin and similar natural substances, are used for binding the formaldehyde released from aminoplast resins during the production of particle boards. One of the simplest methods is described in, German Patent No. 1,055,806. A urea solution is sprayed onto the moist wood particles, after which drying and application of the glues are carried out, i.e. gluing of the particles. However, this method has a decisive disadvantage. Although the formaldehyde is thoroughly bound, the strengths and swelling values of the particle boards deteriorate substantially. Even with the concealed use of urea in a polymer dispersion or a paraffin emulsion, which is applied separately, i.e. before the gluing process, to the particles (German Patent No. 2,740,207), either the required pressing time is longer or the technological properties of the resulting board are poorer. Furthermore, the costs of the particle board per $m^3$ are generally so high that for this reason these processes have not become established.

EP-B 150 420 described the preparation of a curing agent solution for aminoplast adhesive resins which also has a formaldehyde-binding action. This curing agent solution of diammonium salts has proven very satisfactory in the case of phenol-modified melamine/urea/formaldehyde resins in premixed application. However, if this curing agent is mixed with the urea/formaldehyde resins in the low molar ratios of from 1:1.2 to 1:1.35 which are usual today, the result is that the reactivity is too low and the swelling behavior of the particle boards is poor. If the curing agent described in EP-B 150 420 is applied to the particles separately from the glue, a deterioration in the strengths and swelling properties of the resulting particle boards is once again observed.

It is an object of the present invention to provide, using a solution which acts as a formaldehyde acceptor, a process for the production of particle boards which does not have the above disadvantages of the known processes.

We have found that this object is achieved by applying an aqueous solution having a pH of from 3.0 to 6.5, containing an organic acid or, preferably, a mixture of such acids as a curing agent and a formaldehyde-binding, nitrogen-containing compound, in particular urea, and preferably having a very high solids content, if the aqueous solution is applied to the particles or mixed with them in some other way before the gluing process.

The present invention therefore relates to a process for the preparation of woodworking materials having a lower subsequent formaldehyde emission, by mixing lignocellulose-containing particles, in particular wood particles, with a curable binder based on curable aminoplast condensates and then pressing the mixture under the action of heat, a mixture A containing a water-compatible agent for binding formaldehyde being applied to or mixed with the particles before the latter are mixed with the curable binder, wherein the mixture A is an aqueous solution which has a pH of from 3.0 to 6.5, in particular from 4 to 5.5, preferably from 5.0 to 5.5, and contains (a) an organic acid, preferably a mixture of such acids, which acts as a curing agent and attacks wood only insignificantly, if at all, in an amount of more than 15% by weight, based on the solids content of the solution, and (b) a formaldehyde-binding, nitrogen-containing compound, in particular urea, some of the acid preferably being neutralized with a base which is volatile and/or capable of reacting with formaldehyde, preferably ammonia, or the stated pH of the solution being obtained using such a base.

Suitable organic acids (component a) which act as curing agents are those which are not weaker than acetic acid, in particular mixtures of organic carboxylic acids of 1 to 10 carbon atoms, which show little tendency to crystallize out when applied to or mixed with the lignocellulose-containing particles.

They preferably contain not less than 50% by weight of advantageously predominantly aliphatic saturated dicarboxylic acids of 2 to 10 carbon atoms, in particular adipic acid, glutaric acid and succinic acid. An advantageously used mixture of organic acids contains from 23 to 38 parts by weight of succinic acid, from 30 to 55 parts by weight of glutaric acid and from 20 to 35 parts by weight of adipic acid, in addition to minor amounts of other dicarboxylic acids and in particular monocarboxylic acids. Stripping acids as obtained in the industrial production of adipic acid have proven very useful. Among these, examples of very suitable stripping acids are those having the following composition: from 40 to 60% by weight of water, from 16 to 23% by weight of adipic acid, from 1 to 4% by weight of glutaric acid, from 0.5 to 2% by weight of succinic acid, from 15 to 20% by weight of hydroxycaproic acid, from 1 to 2% by weight of formic acid and up to about 1% by weight of other monocarboxylic acids, such as acetic acid, propionic acid, butyric acid, valeric acid and/or caproic acid. For the intended use, this very complex mixture of acids has the advantage that, even in very high concentration, it does not crystallize out during particle board production. The abovementioned stripping acid has, for example, a pH of about 1.7 and, after the addition of the formaldehyde-binding, nitrogen-containing compound, in particular urea, therefore has to be brought to a pH in the abovementioned pH range, which can be effected by adding the required amount of a base which is volatile or capable of reacting with formaldehyde, in particular ammonia.

A preferred formaldehyde-binding, nitrogen-containing compound (component b of the solution) is urea, some of which may also be in the form of a urea/aldehyde resin, in particular one having a high urea content. However, amides, amine salts, urethanes, melamine, polyacrylamide and other known formaldehyde acceptors are also suitable, provided that they can be used for this purpose in solution at the stated pH of the said solution.

It is advantageous in many cases if a part of the organic acids is neutralized with a base which is volatile and/or capable of reacting with formaldehyde, in particular an organic amine of 1 to 10 carbon atoms or preferably ammonia. Volatile means, for the purposes of the present invention, that the base vaporizes at the processing temperature of the press or at least has a high vapor pressure. The presence of, for example, ammonia in the form of the ammonium salts additionally reduces the emission of formaldehyde from the board. It is advantageous if such a base is used to bring the solution of the acid/formaldehyde acceptor mixture to the required pH of the solution of from 3 to 6.5, preferably from 4 to 5.5, i.e. if the base is added in the amount required, in gaseous form or in the form of an aqueous solution.

Suitable mixtures A advantageously contain, based on about 20–40 parts by weight of acid (a), about 10–35 parts by weight of component (b), calculated as urea, which is preferred, and, if required, up to about 10 parts by weight of ammonia (calculated as 100% pure ammonia) or an appropriate amount of another base.

Suitable mixtures A contain aqueous solutions having solids contents of from 30 to 70, in particular from 50 to 65, % by weight. It is advantageous to bring the solids content to a very high value.

The known lignocellulose-containing particles, preferably wood particles such as spruce particles or beech particles, are suitable for the preparation of the woodworking materials, in particular particle boards. With regard to these and to the curable binders based on curable aminoplast adhesive resins, reference may be made to the prior art familiar to the skilled worker. Aminoplast condensates, such as formaldehyde condensates with urea and/or with melamine, can also be modified by adding fairly small amounts of phenol. Suitable condensates or adhesive resins of this type are commercially available as solutions or powders, and the preparation and use of suitable condensates are also described in the prior art. For the novel process, urea/formaldehyde condensates and melamine/urea/formaldehyde condensates are preferred, and can be used in conventional amounts. The present invention is of particular value for low-formaldehyde condensates which have a low molar ratio of formaldehyde to urea, for example from 1.2:1 to 1.4:1.

The woodworking materials, such as particle boards, can be produced in a conventional manner, but the aqueous solutions used according to the invention and acting as formaldehyde acceptors and as aminoplast curing agents are applied to, in particular sprayed on, or mixed with the preferably dry particles prior to the application or admixing of the aminoplast formers as adhesive resins, i.e. before the gluing process. Application of the solutions in an amount of from 0.3 to 3.0, in particular from 0.5 to 1.5, % by weight, based on the weight of the absolutely dry particles, such as wood particles, has proven advantageous.

Gluing with wood glue to which a curing agent, such as ammonium chloride, and the other conventional additives, such as a wax emulsion, have been added can then be carried out in a conventional manner, as can the subsequent pressing to give the woodworking materials, such as particle boards. Advantages of the resulting woodworking materials are described in the Examples and Comparative Experiments below. In these Examples and Comparative Experiments, parts and percentages are by weight, unless stated otherwise.

EXAMPLE 1 AND COMPARATIVE EXPERIMENT A (a) 18 mm thick particle boards were produced from 60% of spruce particles and 40% of beech particles. The pressing time was 160 seconds at 200° C. The boards were cooled in a stack.

(b) The adhesive resin used was an aqueous solution of a commercial urea/formaldehyde condensate (molar ratio 1:1.22) having a solids content of 66.5%, a pH of about 8.4, a density of about 1.293 g/cm$^3$ (20° C.) and a viscosity of from 600 to 850 mPa.s (20° C.).

(c) The adhesive resin was added to the glue solution with a commercial paraffin emulsion containing 50% of paraffin (P emulsion), a 25% strength aqueous ammonium chloride solution (curing agent I) and water.

(d) The aqueous solution (mixture A) which acts as a curing agent and formaldehyde acceptor and was applied to the particles before the latter were treated with glue was prepared by mixing 687 parts of stripping acid (AS1) having the composition:
19% of adipic acid,
3% of glutaric acid,
1% of succinic acid,
17% of hydroxycaproic acid,
2% of formic acid,
less than 1% of acetic, propionic and butyric acid and about 57% of water at about 60-70° C. with 200 parts of urea, the urea rapidly going into solution in the hot stripping acid. Thereafter, 113 parts of 25% strength aqueous ammonia were mixed in. The result was an aqueous solution which had a solids content of about 57% and a pH of 5.5 and did not crystallize out even at 0° C.

(e) Table 1 reproduces the amounts for the mixtures and the results of the board tests for Example 1 and Comparative Experiment A and shows that, by pretreating the particles with the aqueous solutions used according to the invention, the formaldehyde perforator values according to DIN EN 120 can be reduced to 6.9 mg and hence emission class E1 according to the ETB guidelines can be achieved, with an equally short press time and constant strengths and swelling properties.

In the Table, % of acceptor is the percentage of the sprayed-on aqueous solutions which act as curing agents and formaldehyde acceptors, the percentage being based on the solids content of the said solutions and on absolutely dry particles.

TABLE 1

Results of Example 1 and Comparative Experiment A ($\bar{x}$: Determined from 6 boards with 10 individual values each)

($\bar{x}$: 25 (-x: Mean value of 2 determinations)

| | Example 1 | Comparative Experiment A |
|---|---|---|
| Adhesive resin (parts) | 100.0 | 100.0 |
| P emulsion (parts) | 8.0 | 8.0 |
| Curing agent I (parts) | 3.0 | 4.0 |
| Water (parts) | 7.7 | 13.4 |
| % of acceptor | 1.0 | — |
| Solid resin content of batch (%) | 56.0 | 53.0 |
| Gelling time at 100° C. (s) | 43 | 40 |
| Viscosity in 4 mm DIN cup (s) | 44 | 30 |

-continued

| | Example 1 | Comparative Experiment A |
|---|---|---|
| Moisture content of particle cake (%) | 7.4 | 7.5 |
| Board tests/ground: | | |
| Density (kg/m$^3$)$=_x$ | 708 | 713 |
| Flexural strength (N/mm$^2$)$=_x$ | 22.8 | 34.7 |
| (N/mm$^2$)s$^-_x$ | 1.5 | 2.2 |
| (%) V v$^-_x$ | 6.5 | 8.9 |
| Transverse tensile strength V20 | | |
| (N/mm$^2$)$=_x$ | 0.56 | 0.52 |
| (N/mm$^2$)s$^-_x$ | 0.05 | 0.08 |
| (%) v$^-_x$ | 9.5 | 15.3 |
| Swelling after 2 hours (%)$=_x$ | 4.5 | 5.1 |
| Swelling after 24 hours (%)$=_x$ | 20.1 | 22.3 |
| (%) s$^-_x$ | 1.19 | 0.87 |
| (%) v$^-_x$ | 5.9 | 3.9 |
| Perforator value DIN EN 120: | | |
| % moisture content$^-_x$ | 5.2 | 5.4 |
| mg of HCHO/100 g of absolutely dry board$^-_x$ | 6.9 | 12.2 |

We claim:

1. A process for the preparation of woodworking materials having a lower subsequent formaldehyde emission, by mixing lignocellulose-containing particles with a curable binder based on curable aminoplast condensates and then pressing the mixture under the action of heat, a mixture A containing a water-compatible agent for binding formaldehyde being applied to or mixed with the particles before the latter are mixed with the curable binder, wherein the mixture A is an aqueous solution which has a pH of from 3.0 to 6.5 and contains (a) organic $C_1$–$C_{10}$ carboxylic acids which attack wood only insignificantly or not at all, in an amount of more than 15% by weight, based on the solids content of the solution, and (b) a formaldehyde-binding, nitrogen-containing compound, selected from the group consisting of ureas, amides, amine salts, urethanes, melamine, polyacrylamides and mixtures thereof.

2. The process of claim 1, wherein part of the acids are neutralized with a base which is volatile and/or capable of, reacting with formaldehyde.

3. The process of claim 1, wherein, in mixture A, the formaldehyde binding, nitrogen-containing compound is urea in the form of a urea/aldehyde resin.

4. The process of claim 1, wherein the mixture A is an aqueous solution having a pH of from 4 to 5.5.

5. The process of claim 1, wherein the mixture A, comprising organic acids, contains a mixture of aliphatic organic carboxylic acids of 1 to 10 carbon atoms which have little tendency to crystallize out during application to or mixing with the lignocellulose-containing particles.

6. The process of claim 5, wherein the carboxylic acids are all or predominantly aliphatic saturated dicarboxylic acids of 2 to 10 carbon atoms.

7. The process of claim 2, wherein the base is an organic amine of 1 to 10 carbon atoms or ammonia.

8. The process of claim 1, wherein the mixture A contains, based on about 20–40 parts by weight of acid (a), about 10–35 parts by weight of urea and, where a base is added, the amount of the latter corresponds to the amount required to bring the pH within the stated range.

9. A process as claimed in claim 1, wherein, in the mixture A, the aqueous solution has a solids content of from 30 to 70% by weight.

10. A particle board material which is produced by the process of claim 1.

* * * * *